O. THORNLEY.
VEHICLE LAMP.
APPLICATION FILED MAY 28, 1913.

1,094,272.

Patented Apr. 21, 1914.
3 SHEETS—SHEET 1.

Witnesses
J. H. Crawford.
V. B. Hillyard.

Inventor
Olney Thornley,
By Victor J. Evans
Attorney

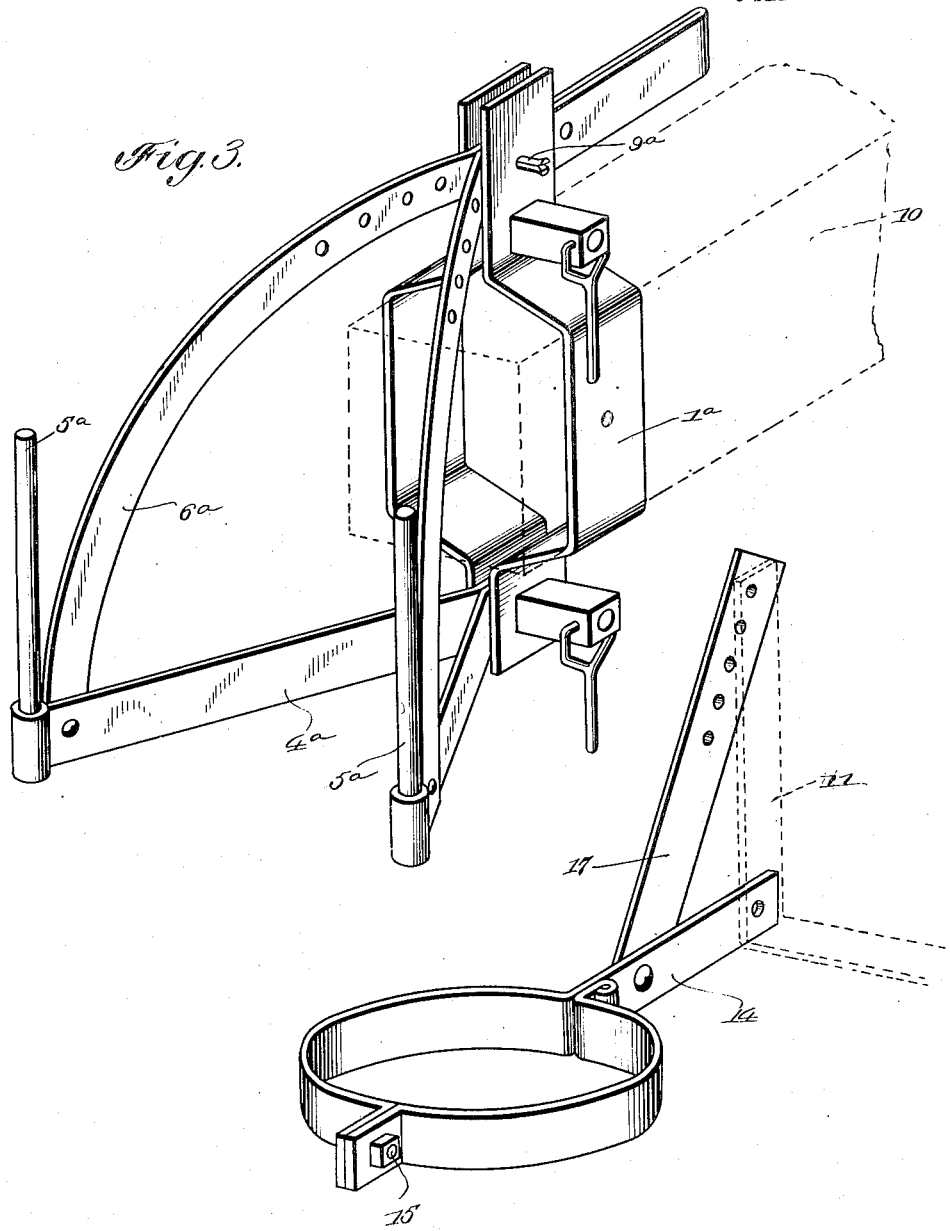

O. THORNLEY.
VEHICLE LAMP.
APPLICATION FILED MAY 28, 1913.

1,094,272.

Patented Apr. 21, 1914.
3 SHEETS—SHEET 3.

Inventor
Olney Thornley,

Witnesses
J. H. Crawford.
V. B. Hillyard.

By Victor J. Evans
Attorney

UNITED STATES PATENT OFFICE.

OLNEY THORNLEY, OF COYLE, OKLAHOMA.

VEHICLE-LAMP.

1,094,272.  Specification of Letters Patent. Patented Apr. 21, 1914.

Application filed May 28, 1913. Serial No. 770,448.

*To all whom it may concern:*

Be it known that I, OLNEY THORNLEY, a citizen of the United States, residing at Coyle, in the county of Logan and State of Oklahoma, have invented new and useful Improvements in Vehicle-Lamps, of which the following is a specification.

The invention relates to vehicle lamps and more particularly to such as are constructed to be fitted to horse drawn vehicles, whether the same be provided with a pole or tongue for a team or with shafts or thills for a single horse.

The invention provides novel means whereby a lantern or like lamp may be secured to the pole or shafts of a vehicle, and which will admit of the inclination of the lamp being adjusted to throw the light upon the roadway any distance or ahead of the vehicle.

A further purpose of the invention is the provision of lamp mountings embodying interchangeable attaching means, whereby the same may be attached to a pole or shaft and whereby the lamp may be shifted from one side of the shafts or thills to the other as may be desirable.

A further purpose of the invention is the provision of a lantern having a combined shield and reflector arranged to throw the light ahead and which is provided with sockets to receive pins or posts of the lamp mountings, whereby the lamp may be easily and quickly placed in position or removed from the vehicle as may be required.

The invention consists of the novel features, details of construction and combination of parts, which hereinafter will be more particularly set forth, illustrated in the accompanying drawings, and pointed out in the appended claims.

Figure 1:
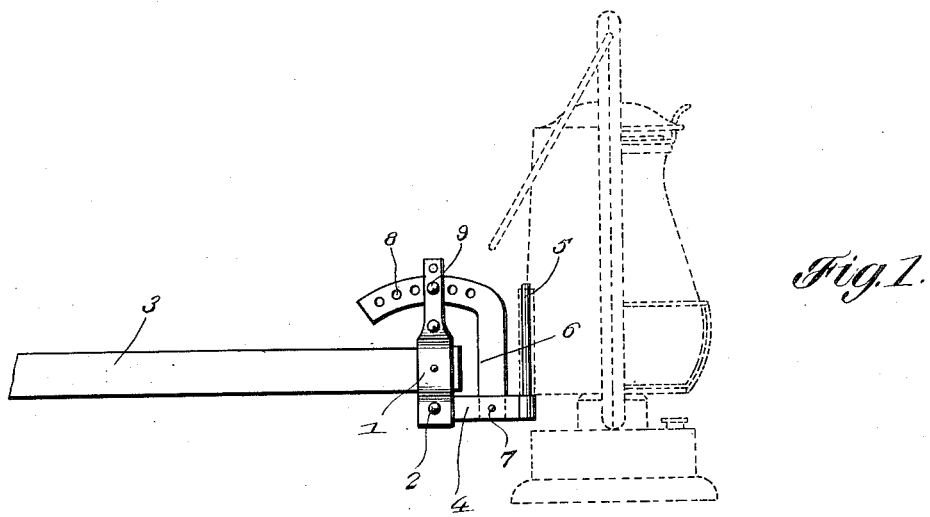
Figure 2:
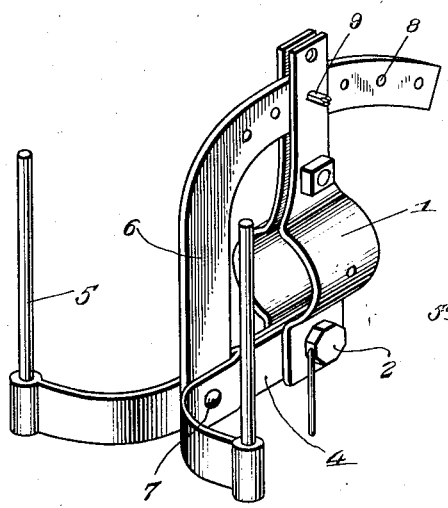
Figure 4:
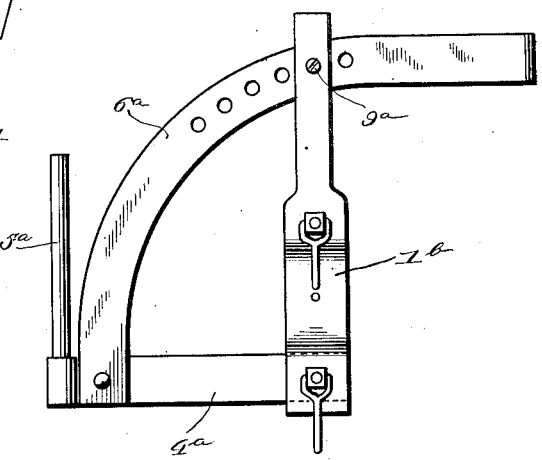
Figure 5:
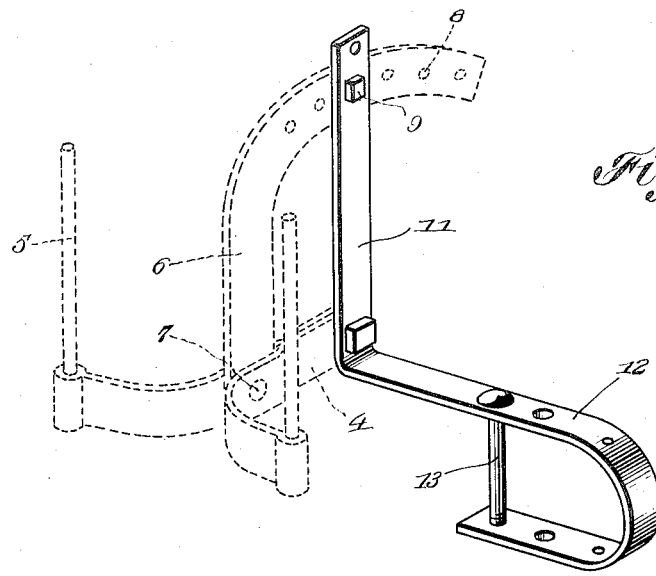
Figure 7:
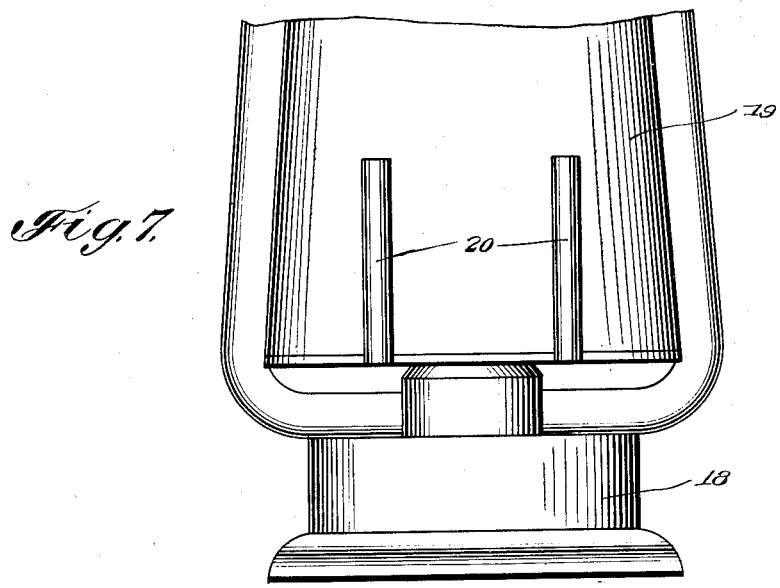

Referring to the drawings, forming a part of the specification, Figure 1 is a detail view, showing the application of the invention for securing a lantern to a vehicle pole or tongue. Fig. 2 is a detail view of the lamp mounting. Fig. 3 is a perspective view of a modification. Fig. 4 shows a different form of clamp used in connection with the modification illustrated in Fig. 3. Fig. 5 is a detail view of a further modification. Fig. 6 is a detail view of a modification embodying a holder for clamping the lamp. Fig. 7 is a detail view of a lantern provided with a combined shield and reflector having sockets fitted thereto for receiving the standards or posts of the lamp mounting.

Corresponding and like parts are referred to in the following description, and indicated in all the views of the drawings, by the same reference characters.

Broadly considered the lamp mount comprises means for attaching the same to the pole or a shaft of the vehicle, a device for making connection with the lamp and an intermediate brace for adjusting the inclination of the lamp to throw the light to any required distance ahead of the vehicle. These several parts are susceptible of modification according to the specific use and adaptation of the invention.

In the form of lamp mount shown in Figs. 1 and 2 the clamp for attaching the same to one of the shafts of a vehicle is formed of similar members 1, which have portions intermediate of their ends oppositely deflected to fit about the shaft which is clamped between them. Bolts 2 serve to draw the members 1 together and clamp them upon the shaft 3. An arm 4 is clamped between the lower ends of the members 1 and receives the lower bolt 2. This arm comprises companion members, which extend in opposite direction at their outer ends and are provided with vertically extending pins or standards 5. A brace 6 is pivotally connected at its lower end to the arm 4 and its upper portion is confined between the upper ends of the clamp members 1. This brace admits of the arm 4 being adjusted to any required inclination to shed the rays of light upon the roadway to any desired distance ahead of the vehicle. The brace 6 is preferably curved in its length and its lower end is received between the parts comprising the arm 4 and is retained in place by means of a pivot fastening 7, which also serves to hold the members comprising the part 4 together. The upper portion of the brace is formed with a plurality of openings 8, which are adapted to register with openings formed in the upper ends of the members 1, a pin 9 passing through the registering openings to hold the brace in the adjusted position. The pins or standards 5 are secured to the extremities of the members comprising the part 4 in any manner.

In the modification shown in Fig. 3 the clamp is formed of similar members 1ª, which have their intermediate portions outwardly crimped or deflected to fit about the pole or tongue 10 of a vehicle. The arm 4ª comprises diverging members, which are provided at their outer ends with pins or standards 5ª. The brace 6ª comprises similar members which have their lower ends pivotally connected to the members comprising the arm 4ª, the upper portions of such members coming together and passing between the upper ends of the member 1ª and being secured thereto in the adjusted position by means of a pin 9ª, which passes through one of a plurality of openings formed in the members of the brace and through openings formed in the upper ends of the member 1ª.

Fig. 4 shows a mount similar to that illustrated in Fig. 3, but the clamp is constructed with especial reference for attaching the mount to one of the shafts of a vehicle of the type provided with thills. The clamp comprises members 1ᵇ somewhat similar in construction to the members 1 of the clamp shown in Figs. 1 and 2. The remaining parts of the mount do not differ from that shown in Fig. 3.

Fig. 5 shows a bracket attachment for connecting the lamp mount to either shaft of a vehicle so that the lamp may be located upon the right or the left of the shafts or thills. This bracket comprises an upright 11 and a clip 12, the latter being adapted to embrace three sides of a shaft, the remaining fourth side being closed by means of a bolt 13 which clamps the members of the clip upon the shaft. The upright 11 is adapted to receive the arm and upper end of the brace of any one of the forms of mounts illustrated.

In Fig. 6 an arm 14 is shown comprising similar members which are hingedly connected at one of their ends and have their opposite ends formed with extensions which are pierced to receive a bolt 15, whereby the members may be drawn together so as to clamp a lamp placed between the members of the arm. This arm may be attached to the bracket, shown in Fig. 5. A brace 17 is interposed between an end portion of the arm 14 and bracket to hold the lamp at the required inclination for the purposes hereinbefore specified. The lamp 18 illustrated is of the lantern type and the globe is protected upon the rear side by means of a combined shield or guard and reflector 19, the same being secured at its vertical edges to the uprights of the lantern frame. Sockets or sleeves 20 are secured to the rear side of the combined shield and reflector 19 and are adapted to receive the pins or standards 5 when the lamp is placed in position upon the vehicle.

From the foregoing, taken in connection with the accompanying drawings, it will be understood that the invention provides simple and effective means for attaching any style of lamp to the pole or shafts of vehicles, said lamp being adjustable to throw the light upon the roadway to any distance ahead of the vehicle. When the lamp is to be applied to the shafts of a vehicle having thills the invention is such as to admit of the lamp being located upon one side or the other and moved to any point along the shafts, as may be required. The bolts for clamping the members of the attaching device may be provided with any type of nuts, such as thumb or tail nuts, thereby avoiding the necessity of using a wrench or screwdriver for tightening or loosening the fastenings when making adjustments or placing the mount in position.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. Means for securing a lamp to the pole or shaft of a vehicle, the same comprising an attaching means, an arm provided with means for receiving the lamp, and a brace between such arm and attaching means to admit of angularly adjusting the arm to regulate the inclination of the lamp to throw the light to any distance ahead of the vehicle.

2. A vehicle lamp mount of the character specified comprising a clamp, a lamp receiving arm pivotally connected to one end of the clamp, and a brace between the opposite end of such clamp and arm for holding the latter in the required angular position.

3. A lamp mount comprising a clamp formed of similar members having intermediate portions oppositely deflected, a lamp receiving arm pivotally secured between the lower ends of the clamp members, and a brace between the lamp receiving arm and the opposite end of the clamp and received between the members of such clamp, said brace being adjustable to admit of the relative inclination of the arm being varied, whereby light may be thrown to any distance ahead of the vehicle.

4. A lamp mount of the character described comprising a clamp formed of similar members having their intermediate portions oppositely deflected, a lamp receiving arm pivotally supported between the lower ends of the clamp members, a brace pivotally connected to the outer end of the lamp receiving arm and passing between the upper ends of the clamp members, the upper portion of such brace being provided with a plurality of openings, and means for adjustably connecting the brace to the clamp.

In testimony whereof I affix my signature in presence of two witnesses.

OLNEY THORNLEY.

Witnesses:
C. S. REED,
THEO. LOWER.